W. J. TERRY.
MILLING MACHINE.
APPLICATION FILED SEPT. 2, 1919.
1,397,709.
Patented Nov. 22, 1921.
2 SHEETS—SHEET 1.
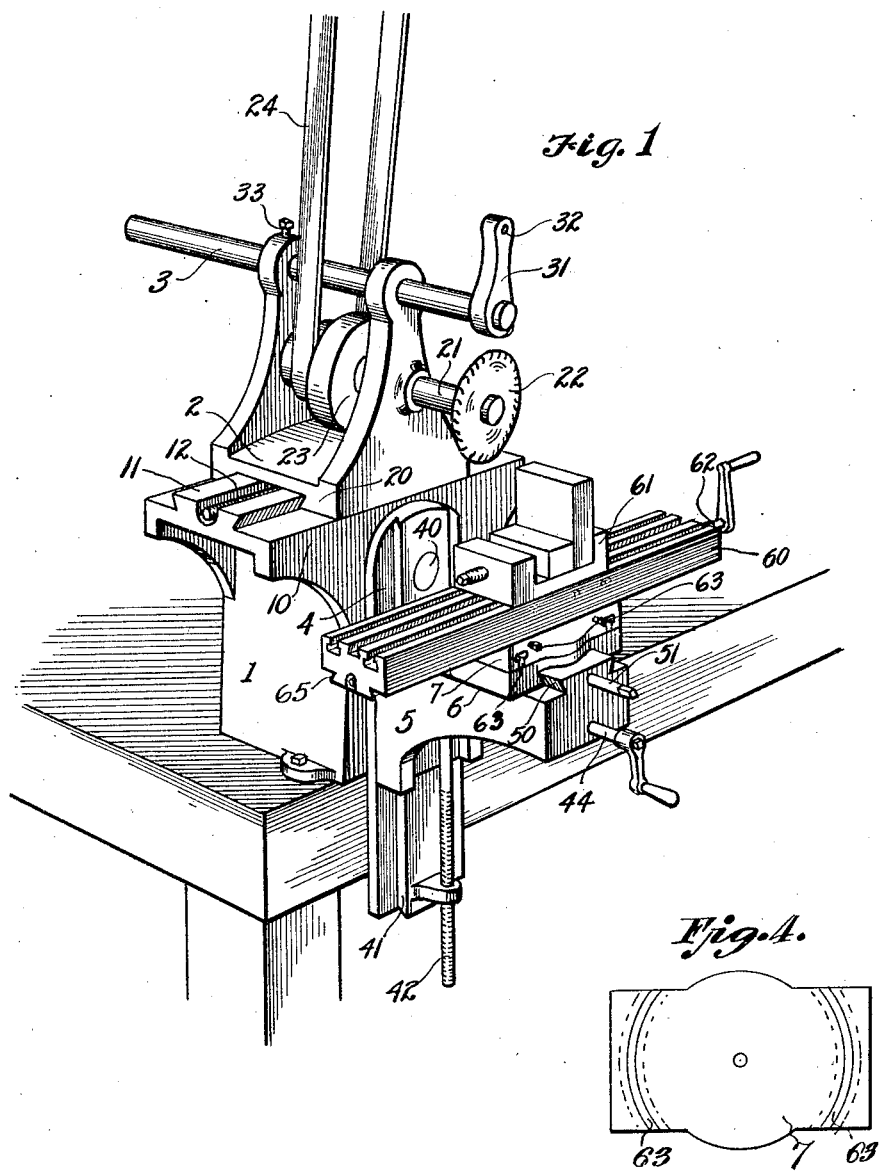
Inventor
WALTER J. TERRY
By Reynolds & Cook.
Attorney W. J. TERRY.
MILLING MACHINE.
APPLICATION FILED SEPT. 2, 1919.
1,397,709.
Patented Nov. 22, 1921.
2 SHEETS—SHEET 2.
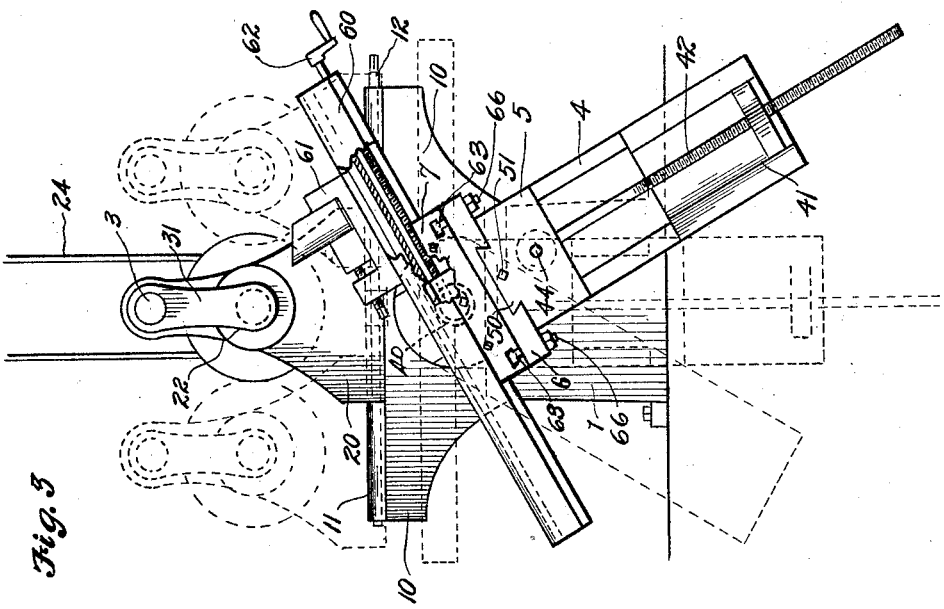
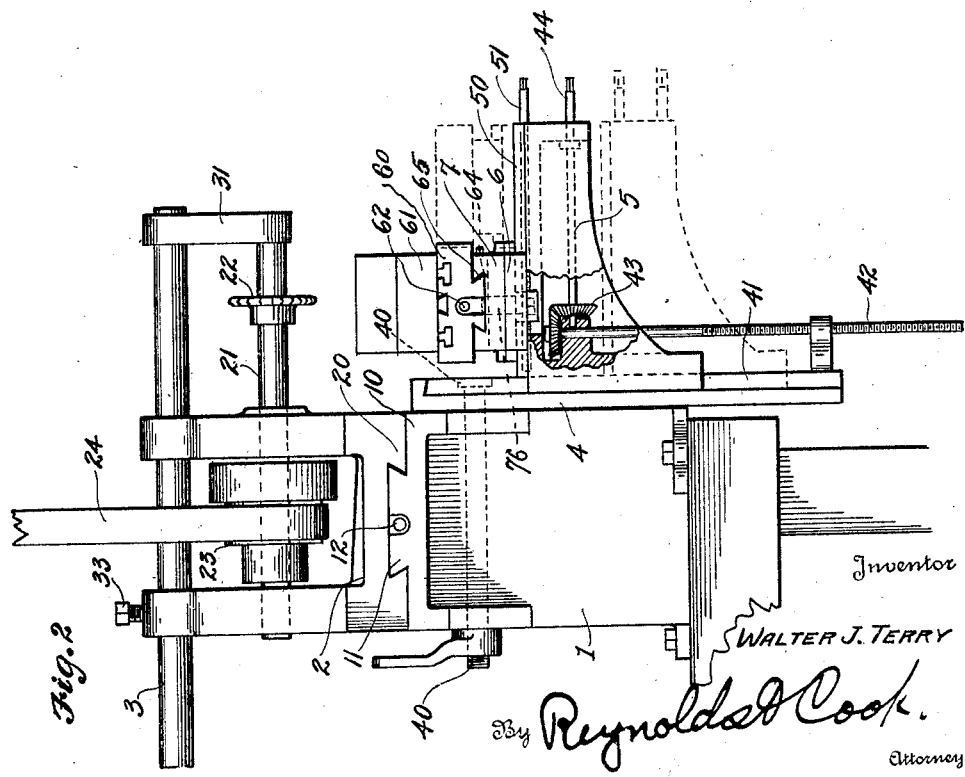
Inventor
WALTER J. TERRY
By Reynolds & Cook.
Attorney

UNITED STATES PATENT OFFICE.

WALTER J. TERRY, OF SEATTLE, WASHINGTON.

MILLING-MACHINE.

1,397,709.   Specification of Letters Patent.   Patented Nov. 22, 1921.

Application filed September 2, 1919. Serial No. 320,975.

*To all whom it may concern:*

Be it known that I, WALTER J. TERRY, a citizen of the United States, and resident of the city of Seattle, county of King, and State of Washington, have invented certain new and useful Improvements in Milling-Machines, of which the following is a specification.

My invention relates to milling machines and consists of a novel construction and combination of parts whereby the machine is adapted for doing a wide range of work.

The object of my invention is to provide a machine which may be adjusted and operated in such manner as to perform many operations which are not possible with the ordinary milling machines.

The features of my device which I deem to be new and upon which I desire to secure patent will be hereinafter described.

In the accompanying drawings I have shown my invention embodied in a construction which is now most preferred by me.

Figure 1 shows in perspective a machine having my invention incorporated therein.

Fig. 2 is a side elevation of the same machine.

Fig. 3 is a front elevation of the same machine.

Fig. 4 is a bottom plan view of a detail of my invention.

The particular machine herein illustrated has been designed for handling work of small size; in other words, it is intended for use as a bench tool. It is of course evident that the principles herein employed may be applied to a tool of any size.

The frame 1 is provided with a fixed head 10 which extends transversely of the direction of the axis of the cutter bearing shaft 21. The movable head 2 has a base which is mounted upon the head 10 so as to have a movement in the transverse direction indicated. These are held firmly together, but so as to permit of this transverse movement by any suitable means, such, for instance, as the gibs 11 and 20 of the two parts. Means are provided whereby the movable head 2 may be caused to travel across the frame. Such means as herein shown consists of a threaded rod 12 which is secured against longitudinal movements with relation to one of the parts while having a threaded engagement with the other, whereby, through the turning of this shaft, the movable head 2 may be caused to travel across the fixed head 10.

Journaled in the uprights of the movable head 2 is the shaft 21, to which is secured the rotary milling cutter 22. To this same shaft is secured a belt pulley 23, over which passes a drive belt 24. The turning of the shaft 21 may, of course, be secured through the use of any suitable mechanism. I prefer to use the belt drive after the manner indicated, because such a drive from a shaft above the machine permits a lateral movement of the head through a considerable range, without the necessity of providing any especial construction to accommodate this movement.

With the above mechanism I prefer to employ a steady bar 3, which is circular in cross section and is adapted to be moved lengthwise and turned for adjustment. At its outer end the carrying arm 31 is provided, at the point 32, with means for engaging and supporting the outer end of the cutter shaft 21, to thereby give it additional support when, either the work is heavy or the cutter is placed at some distance from the bearing of this shaft. This steady bar may be moved in or out as desired and the arm 31, when the bar is not in use, may be turned up, as is shown in Fig. 1, and it is thus put out of the way. The bar 3 may be secured in adjusted position by means of a set screw 33.

The means for supporting and handling the object being operated upon comprises the following parts. A plate 4 is pivotally supported upon an axis 40, which axis lies below and is parallel with the axis of the cutter carrying shaft 21. This plate is capable of being clamped in adjusted position and permits adjustment of the angular position of the work holding members relative to the direction of travel of the tool upon its guideways.

The plate 4 is provided with guideways 41 which, in the normal position of this plate, extend vertically. A knee 5 is provided with complemental guide ways engaging the guide ways 41 and holding the same securely, while permitting vertical adjustment; such vertical adjustment may be secured by the use of a threaded shaft 42 after the well known manner of construction. The operation of the shaft 42 may be secured by means of bevel gears 43 and a shaft 44 which extends to the outer end of the knee 5.

The knee 5 has guideways 50 extending horizontally on its upper surface, which guideways are parallel with the direction of the axis 40 upon which the plate 4 swings and the axis of the cutter carrying shaft 21. A block 6 is provided with guideways complemental to the guideways 50, and is thus capable of movement toward and from the plate 4. This movement may be secured through a threaded shaft 51 which acts in a manner similar to that of the threaded shaft 42.

Carried by the block 6 so as to be turned about a vertical pivot axis is a block 7, and carried by block 7 is the bar 60, the latter being long and serving as a guideway for the work holding or clamping member 61. The two blocks 6 and 7 are clamped together by bolts 66, the heads of which enter the curved T-head grooves 63 in the block 7. The bar 60 is provided with guideways 65 and block 7 with complemental guideways, and a feed screw or rod 62, by which feed movements are secured, and upon which bar the clamp or work-holding block 61, with complemental parts, is secured. The swinging or pivot connection between the two blocks 6 and 7, as shown, consists of the T-head grooves 63 in the block 7, which may be formed as segments of a circle upon the pivot center 76, and bolts 66 carried by the base block 6, these bolts 66 serving to clamp the blocks 6 and 7 together, as has been described.

The various parts just described enable movement of any object being operated upon in substantially any direction which may be desired. The various parts carried by the knee 5 permit universal movement of the work relative to the cutter. Being mounted upon an axis 40 so that the angular position of these parts may be adjusted and the cutter carrying shaft being mounted upon a head which may be given traversing movement, angular surfaces may be dressed upon the work by properly setting the work holder and causing the cutter carrying head to travel upon its guides. Such a condition is illustrated in Fig. 3, the dotted outlines of the cutter carrying head, indicate approximately the amount of travel which may be given thereto and the extent of surface which may be dressed in this manner. The manner of handling the tool for various jobs will be evident to a mechanic familiar with this kind of machinery.

I claim:

1. A milling machine comprising a frame, a milling head having a horizontal axis, a work holding table mounted for adjustment about a horizontal axis which is below the axis of the milling head, said frame and milling head having horizontally extending engaging guideway members located between said two axes whereby the milling head may be moved bodily in a horizontal plane parallel with said axes.

2. A milling machine comprising a frame, a milling head, said frame and milling head having engaging guideway members whereby the milling head may be moved bodily in a direction perpendicular to its axis, a work holding table mounted for adjustment about an axis which is parallel with and laterally removed from the plane of movement of the axis of the milling head, and a work holder mounted for movement upon said table in a direction which is perpendicular to the axis of adjustment of the said table and in a plane which is common with the direction of movement of the cutting tool of the milling head.

3. A milling machine having a frame, a milling head mounted thereon for travel in a plane which is perpendicular to the axis of rotation of the cutter, a work support, means for moving said work support along each of the three coördinate axes, and means for adjusting all of said work moving means about an axis which is parallel with the axis of the cutter.

4. A milling machine having a frame, a milling head mounted thereon for travel in a plane which is perpendicular to the axis of rotation of the cutter, a plate pivoted upon an axis parallel with the axis of the cutter, and a work support mounted upon said plate for movement along each of the three coördinate axes.

5. A milling machine having a frame, a milling head mounted thereon for travel in a plane which is perpendicular to the axis of rotation of the cutter, a plate pivoted upon an axis parallel with the axis of the cutter, and said axis being in a plane perpendicular to the plane of movement of the milling head, and a work support mounted upon said plate for movement along each of the three coördinate axes.

Signed at Seattle, Wash., U. S. A., this 26th day of August, 1919.

WALTER J. TERRY.